United States Patent
Woldmann et al.

(10) Patent No.: US 7,839,008 B2
(45) Date of Patent: Nov. 23, 2010

(54) METHOD FOR THE OPERATION OF A WIND ENERGY PLANT WITH A DOUBLE-FED ASYNCHRONOUS GENERATOR AND WIND ENERGY PLANT WITH A DOUBLE-FED ASYNCHRONOUS GENERATOR

(75) Inventors: Thomas Woldmann, Hamburg (DE); Kay Richter, Norderstedt (DE)

(73) Assignee: Nordex Energy GmbH, Norderstedt (DE)

( * ) Notice: Subject to any disclaimer, the term of this patent is extended or adjusted under 35 U.S.C. 154(b) by 827 days.

(21) Appl. No.: 11/764,417

(22) Filed: Jun. 18, 2007

(65) Prior Publication Data
US 2010/0096853 A1    Apr. 22, 2010

(30) Foreign Application Priority Data
Nov. 2, 2006    (DE)    ......... 10 2006 051 546

(51) Int. Cl.
*F03D 9/00*    (2006.01)
*H02P 9/00*    (2006.01)
(52) U.S. Cl. .............. 290/44; 322/24; 322/99
(58) Field of Classification Search ........... 290/43, 290/44, 7, 55; 322/23, 24, 37, 99
See application file for complete search history.

(56) References Cited

U.S. PATENT DOCUMENTS

| | | | |
|---|---|---|---|
| 4,461,957 A * | 7/1984 | Jallen | 290/44 |
| 5,798,632 A * | 8/1998 | Muljadi | 322/29 |
| 7,068,015 B1 * | 6/2006 | Feddersen | 322/89 |
| 7,462,947 B2 * | 12/2008 | Wobben | 290/44 |
| 7,518,256 B2 * | 4/2009 | Juanarena Saragueta et al. | 290/44 |
| 7,692,325 B2 * | 4/2010 | Ichinose et al. | 290/44 |
| 2006/0163881 A1 * | 7/2006 | Bucker et al. | 290/44 |
| 2007/0052244 A1 * | 3/2007 | Hudson | 290/44 |

FOREIGN PATENT DOCUMENTS

| | | |
|---|---|---|
| DE | 37 27 696 A1 | 3/1989 |
| DE | 90 15 945.4 U1 | 5/1992 |
| DE | 101 17 212 A1 | 10/2002 |
| EP | 1 548 278 A2 | 12/2004 |
| GB | 696653 A | 9/1953 |
| JP | 57166895 A | 10/1982 |
| WO | 20204025823 A1 | 3/2004 |
| WO | 2008039119 A1 | 4/2008 |

* cited by examiner

*Primary Examiner*—Nicholas Ponomarenko
(74) *Attorney, Agent, or Firm*—Vidas, Arrett & Steinkraus

(57) ABSTRACT

A method for the operation of a wind energy plant with a double-fed asynchronous generator which has a mode of operation as a phase shifter, in which reactive power is fed into the electric power supply grid, the method having the following steps: the stator of the asynchronous generator is short-circuited, the asynchronous generator is run-up to a predetermined rotational speed from a working rotational speed range via a converter after running up, the short-circuit in the stator is cancelled, the double-fed asynchronous generator is synchronized with the electric power supply grid, and it is driven for the generation of reactive power.

11 Claims, 1 Drawing Sheet

Figure 1:
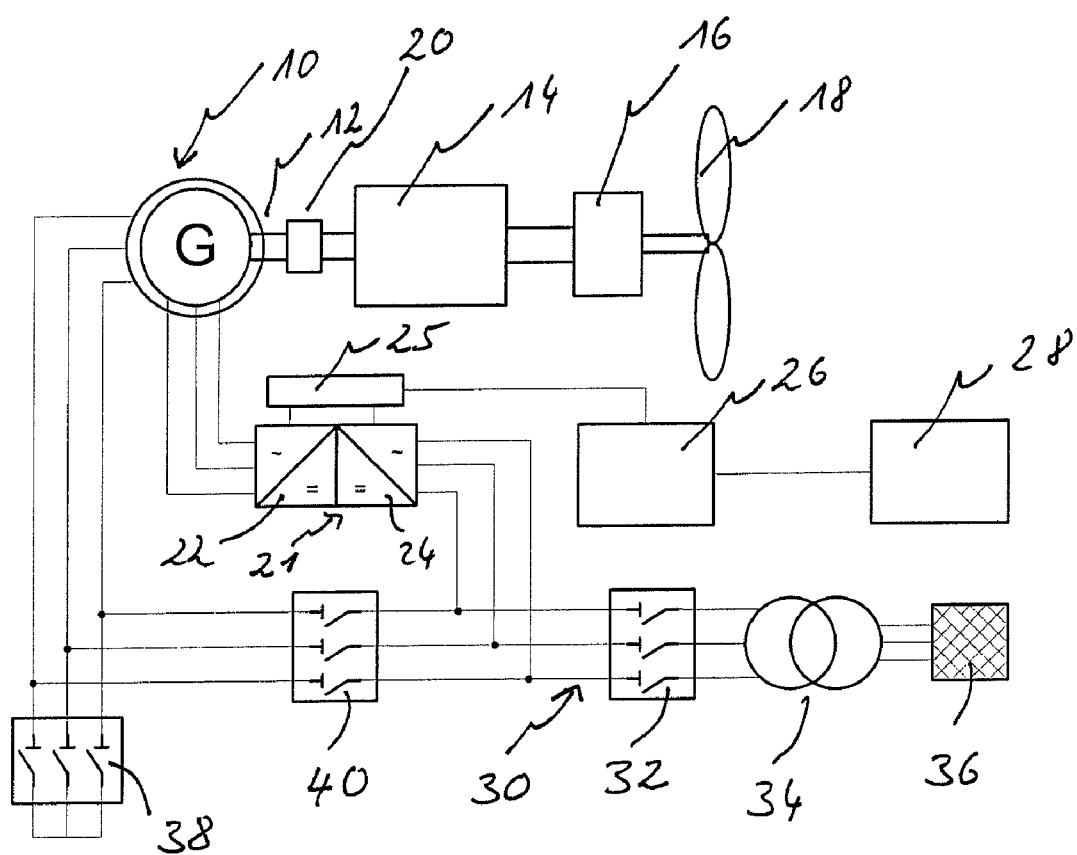

METHOD FOR THE OPERATION OF A WIND ENERGY PLANT WITH A DOUBLE-FED ASYNCHRONOUS GENERATOR AND WIND ENERGY PLANT WITH A DOUBLE-FED ASYNCHRONOUS GENERATOR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to the operation of a wind energy plant with a double-fed asynchronous generator, which has a mode of operation as a phase shifter. In this mode of operation, reactive power is fed into the electric power supply grid by the wind energy plant. The invention is also related to a wind energy plant with a double-fed asynchronous generator which is suited in a particularly high degree for feeding reactive power into the grid.

In a wind energy plant with a double-fed asynchronous generator, the stator is directly connected to the electric power supply grid. The rotor is electrically connected to a converter via slip rings. The converter has to be dimensioned only for the slip power of the generator. The latter is proportional to the rotational speed slip s of the asynchronous generator: wherein $n_S$ means the synchronous generator rotational speed and $n_R$ the generator's maximum working rotational speed.

A wind energy plant with a double-fed asynchronous generator can feed reactive power into the electric power supply grid under the following conditions: via a grid converter (reactive power support) in the normal active power production operation, via the rotor converter as well as via the generator and/or the grid converter in the normal active power production operation.

The present invention is based on the objective to provide a method for the operation of a double-fed asynchronous generator and to create a wind energy plant with a double-fed asynchronous generator which permits the production of reactive power in a particularly simple manner.

BRIEF SUMMARY OF THE INVENTION

According to the present invention, the objective is resolved by a method with the features of claim 1. Advantageous embodiments form the subject matters of the subclaims.

The method according to the present invention provides to short-circuit the stator of the asynchronous generator. In doing so, the asynchronous generator is not connected to the electric power supply grid, of course. The asynchronous generator is run-up in its short-circuited state to a predetermined rotational speed from a working rotational speed range via a converter. In order to be able to set the wind energy plant into an operation as a phase shifter, a working rotational speed range is defined. Within this working rotational speed range, the wind energy plant can be used as a phase shifter. During the run-up, the asynchronous generator with short-circuited stator is driven via a converter, in order to let it occupy a predetermined rotational speed from the working rotational speed range. According to the present invention, after the run-up the short-circuit in the stator is cancelled and the asynchronous generator is synchronised with the electric power supply grid in regard to voltage, frequency and phase position and it is driven for the production of reactive power. In the method according to the present invention, even without being driven by wind, the wind energy plant can be used as a phase shifter, and with this for the support of the electric power supply grid. In this mode of operation, the asynchronous generator is run-up to the necessary rotational speed. In the phase shifter operation, from the electric power supply grid only that active power has to be taken out from the power supply grid which is necessary for the compensation of the internal power consumption and of the losses. This fraction of active power taken out is very small compared with the provided reactive power.

In a preferred embodiment, the asynchronous generator is run-up in a working rotational speed range which amounts to 50 to 150 percent of the rated rotational speed. Preferably, the working rotational speed range can also amount to 70 percent to 130 percent. Commonly, the selection of the predetermined rotational speed is determined by the fact that a better generator cooling is provided at higher rotational speed. The higher the cooling power of the generator, the higher is the reactive power which can be continuously generated. Further, it has to be taken into account that the generator is not driven after the run-up and directly before linking it up into a grid-parallel operation. From this reason, it has to be made sure in the selection of the predetermined rotational speed that the generator has a rotational speed which is sufficiently high to allow it to be operated with a sufficient rotational speed in the grid parallel operation even after a link-up. In doing so, a rotational speed is preferably selected which is above the synchronous rotational speed.

In a preferred embodiment, gearbox and asynchronous generator are uncoupled from each other during the phase shifter operation. Through this, the generator can rotate independently from the gearbox and the rotor, respectively, in the generation of the reactive power. In principle, it is possible to accelerate even the whole drive train with rotor and blades in a time-limited phase shifter operation, and thereafter to continue operation. However, in this embodiment the active power taken out from the grid is then significantly greater than at uncoupled drive train, because not only the losses coming up on the generator must be compensated, but also the losses from the drive train and from the drag of the rotor blades.

Preferably, after the run-up of the asynchronous generator to the predetermined rotational speed, the converter driving the short-circuited asynchronous generator is switched off and the short-circuit in the stator is cancelled. Practically, it is waited until stator field and rotor field have decayed. In this period, the rotational speed of the asynchronous generator decreases. Subsequently, the asynchronous generator is synchronised with the grid by the converter. A desired value for the reactive power to be fed is preset for the converters.

The objective according to the present invention is also resolved by a wind energy plant with a double-fed asynchronous generator having a motor contactor, which short-circuits the stator of the generator. With the short-circuited stator, it is then possible to drive the asynchronous generator as a motor by a rotor side drive and to run it up to a predetermined rotational speed.

In addition to the motor contactor according to the present invention, a stator energising device is provided in the wind energy plant, a stator contactor preferably, which connects the stator with a connection point for the wind energy plant. In the connection point, a power circuit breaker is provided, which connects the wind energy plant to the electric power supply grid, for instance to a transformer station connected with it.

The wind energy plant according to the present invention has preferably a rotor converter and a grid converter, via which the rotor is driven. Preferably, a converter control unit is provided, which drives the rotor converter and the grid converter, the converter control unit receiving a desired value for the reactive power to be generated from a farm- or grid controller in this.

Preferably, a clutch is provided between the generator and the gearbox, in order to mechanically separate the generator from the drive train.

BRIEF DESCRIPTION OF THE VIEW OF THE DRAWING

FIG. 1 shows an asynchronous generator 10, which is driven via a shaft 12. The torque for the shaft 12 is taken from the wind via a rotor 16 and the rotor blades 18 belonging to it and is forwarded to a gearbox 14. The gearbox 14 may be coupled with an input shaft for the rotor of the generator via a clutch 20, as is represented.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated Electrically, the rotor is connected with a rotor converter 22, which is coupled to a grid converter 24 via a direct current intermediate circuit (not shown). Both converters 22 and 24 are driven via a converter control unit 25 and a wind energy plant control unit 26, which may be a part of an overall control unit. For the wind energy plant control unit 26, desired values for the reactive power to be fed are pre-set from a farm- or grid control unit 28 in the shown example of realisation.

The grid side converter 24 is coupled to output lines 30, which are coupled to the electric power supply grid 36 via a power circuit breaker 32 and a MS-transformer 34.

At the stator side, the asynchronous generator is electrically connected to a motor contactor 38. At closed motor contactor 38, the coils in the stator are short-circuited. Further, the stator of the asynchronous generator 10 is connected with the output lines 30 via a stator energising device 40. When the stator energising device 40 is closed and the motor contactor 38 is opened, the grid voltage is applied to the stator, when the power circuit breaker 32 is closed also.

In the phase shifter operation, the stator of the asynchronous generator is connected to the grid and the rotor is driven for generating the demanded reactive power via the rotor converter 22. In this, the generator 10 is supplied with the necessary active power from the grid 34, via the converter 22. Preferably, the gearbox 14 is to be uncoupled from the generator shaft via the clutch 20 in the phase shifter operation, so that the active power necessary for maintaining the rotational speed is only corresponding to the losses in the generator and the converter.

In order to come into the phase shifter operation, the motor contactor 38 is closed at opened stator energising device 40 at first in the method according to the present invention. Through this, the stator is short-circuited and the rotor converter 22 can be driven at closed power circuit breaker via power taken out of the grid, in order to reach a rotational speed within or slightly above the working rotational speed range, in particular, 15 percent of the synchronous generator rotational speed remain as power reserves for regulation, for instance. In a consecutive step, the rotor converter 22 is switched off and the motor contactor 38 is opened. After the decay of rotor and stator field, the generator is newly magnetised via the rotor converter 22. The converter synchronises the generator with the grid and links the generator via the power circuit breaker 32 with the grid. The motor contactor 38 is only used for running-up, in order to be able to change over into the phase shifter operation.

The generator is braked down in the phase shifter operation by electrical and mechanical losses. The rotor converter 22 takes up this power from the electric power supply grid 36 and leads it to the generator 10, in order to keep the rotational speed constant in the end.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the operation of a wind energy plant with a double-fed asynchronous generator (10) which has a mode of operation as a phase shifter, in which reactive power is fed into the electric power supply grid (36), the method having the following steps: the stator of the asynchronous generator is short-circuited, the asynchronous generator is run-up to a predetermined rotational speed from a working rotational speed range via a converter (22, 24), after running up, the short-circuit in the stator is cancelled, the double-fed asynchronous generator (10) is synchronised with the electric power supply grid, and it is driven for the generation of reactive power.

2. A method according to claim 1, characterised in that the working rotational speed range extends from 50 percent of the rated rotational speed to 150 percent of the synchronous generator rotational speed.

3. A method according to claim 1, characterised in that the working rotational speed range extends from 70 percent of the rated rotational speed to 130 percent of the synchronous generator rotational speed.

4. A method according to claim 1, characterised in that during the phase shifter operation, gearbox (14) and asynchronous generator (10) are uncoupled from each other.

5. A method according to claim 1, characterised in that after running up the asynchronous generator to the predetermined rotational speed, the converter driving the asynchronous generator is switched off and the short-circuit in the stator is cancelled.

6. A method according to claim 5, characterised in that it is waited until stator field and rotor field have decayed.

7. A method according to claim 6, characterised in that the asynchronous generator is newly magnetised by the converter (22).

8. A method according to claim 1, characterised in that the converter (22) synchronises the generator.

9. A method according to claim 1, characterised in that a desired value for the reactive power is pre-set.

10. A method according to claim 1, characterised in that the reactive power to be fed is generated via the generator side converter (32) and the generator (10).

11. A method according to claim 1, characterised in that the reactive power to be fed is generated via the grid side converter (24).

* * * * *